April 9, 1929.   C. L. CARPENTER ET AL   1,708,118
SEPTIC TANK
Filed March 18, 1926
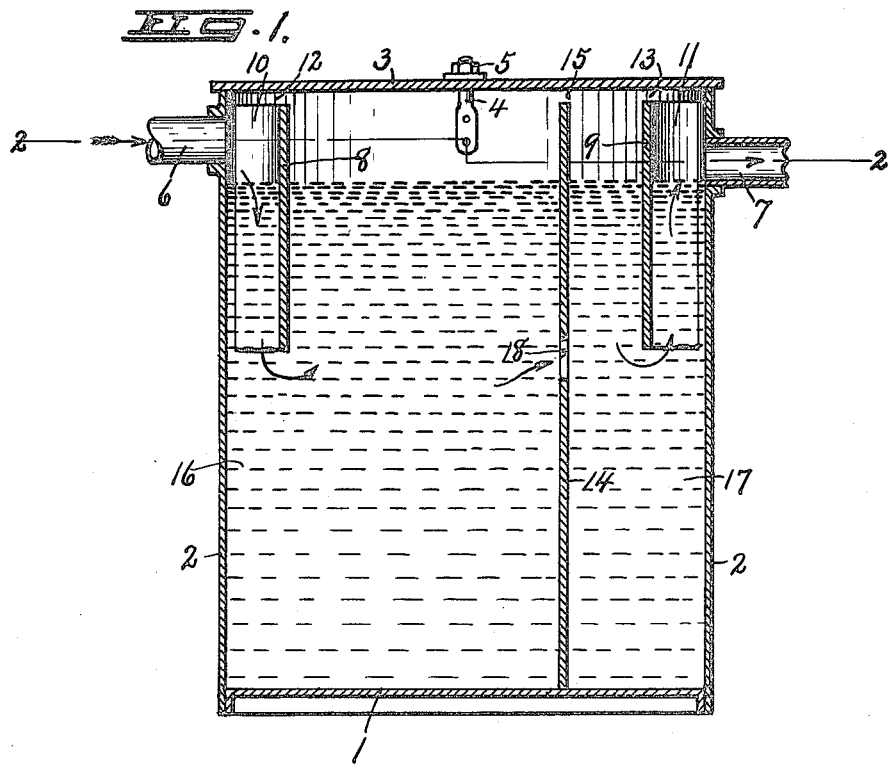
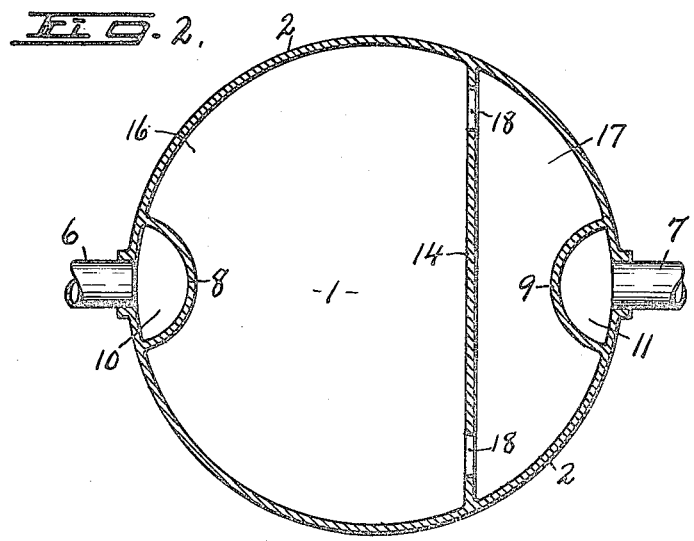
WITNESS
H. V. First.
INVENTOR
C. L. Carpenter
W. E. Jaquith
BY Denison & Thompson
ATTORNEYS Patented Apr. 9, 1929.

1,708,118

UNITED STATES PATENT OFFICE.

CHARLES L. CARPENTER AND WILLARD E. JAQUITH, OF SYRACUSE, NEW YORK.

SEPTIC TANK.

Application filed March 18, 1926. Serial No. 95,595.

This invention relates to a septic tank adapted to be installed in any suitable position preferably underground, for receiving sewage.

These tanks are designed for use by individuals in rural districts and other places where general sewer systems are impracticable, and the main object of the invention is to construct the septic tank in such a manner as to diffuse or spread the inflow of sewage therein and thereby to create a minimum disturbance of the contents and to promote a more efficient bacteria action, better sedimentation, and a more sanitary disposition of the liquid discharge.

Another object is to provide means for retarding the flow of sewage through the tank from the intake to the outlet for the purpose of improving sedimentation and septic action, and the quality of the liquid discharge and at the same time to reduce to a minimum the liability of collection of dead or inactive matter at such corners as may be formed at the junctions of the partitions with the sides of the tank or between the baffle plates and the tank.

Other objects and uses relating to specific parts of the apparatus will be brought out in the following description.

In the drawings:

Figure 1 is a vertical sectional view of one form of septic tank embodying various features of the invention.

Figure 2 is a horizontal sectional view of the same taken in the plane of line 2—2, Figure 1.

As illustrated, this apparatus comprises a tank having a bottom wall —1—, upright side walls —2— and a top wall —3—, all secured together in such a manner as to form liquid and gas-tight joints, the top section or lid —3— being preferably removable when desired, but normally is held in its closed position by lug-bolts —4— and nuts —5—, which may be arranged in any suitable relation to firmly hold the cover in its closed position.

The tank is shown as cylindrical, but may be made of any suitable form, size or material, and is provided near the top thereof with an inlet passage or conduit —6— and an outlet passage or conduit —7—, said passages or conduits being arranged at different levels with the outlet conduit preferably at the lower level just sufficiently below the intake or inlet conduit to assure a free and unobstructed flow of the sewage into the tank, and yet of sufficient height from the bottom —1— to assure more perfect sedimentation, and allowing free overflow of the liquid which may be allowed to diffuse or seep through the soil.

Suitable upright baffle plates —8— and —9—, preferably of substantially semi-circular cross-section are secured along their opposite upright edges to the side walls of the tank so as to extend across the inner ends of the inlet and outlet passages —6— and —7— respectively, said baffle plates being extended vertically some distance below and also some distance above their respective passages in spaced relation to the inner ends thereof so as to form vertical passages —10— and —11— communicating with the corresponding openings. These baffle plates are of uniform height and extend downwardly from their respective inlet and outlet passages a distance considerably greater than the distance of their extension above said passages, the lower ends terminating a considerable distance above the bottom —1— while the upper ends terminate relatively short distances from the top section or cover-plate —3— to form horizontal passages —12— and —13— connecting the upper ends of the passages —10— and —11— with the interior of the tank.

In other words, the passages —10— and —11— are open at the top and bottom, the bottom openings, permitting the passage of the sewage and liquid therethrough, while the open upper ends allow the escape of gases from the interior of the tank through the outlet.

The baffle plate —8— serves to deflect the direct influx of sewage downwardly below the level of the outlet —7— and thereby to expedite the sedimentation and separation of the sediment from the liquid, and at the same time retards the flow of the sewage through the tank sufficiently to allow the desired separation of the solids from the liquid.

The inlet and outlet passages —6— and —7— are preferably located in opposite sides of the tank so as to further retard the flow of the sewage through the tank, and thereby to assure a more effective sedimentation and bacteria action than would be possible with a direct or rapid flow. In like manner the baffle plate —9— additionally retards the direct out-flow of the sewage from the inlet to the outlet so that the major portions of any solids may be held in suspension while the liquid will necessarily have to pass downwardly from the level of the outlet around the lower edge of the baffle plate —9—, thereby leaving its deposit in the tank below the lower end of said baffle plate and allowing the separated liquid to rise in the passage —11— and overflow through the outlet —7—.

As a further means for effecting this retardation of the direct flow of the sewage through the tank from the inlet to the outlet, and also to expedite the automatic separation of the solids from the liquid, the tank is provided with an internal upright partition —14— extending from the bottom —1— upwardly above the level of the inlet —6— and outlet —7— and terminating at the top a short distance from the cover-plate —3— to form an intervening gas passage —15—, said partition extending from side to side of the tank and secured to the opposite sides thereof in such manner as to form liquid and gastight joints therewith. This partition is located between the baffle plates —8— and —9— and therefore between the inlet —6— and outlet —7—, but preferably nearer the baffle plate —9— and outlet, thereby dividing the interior of the tank into two compartments —16— and —17—, in which the compartment —16— is relatively larger than the other compartment to receive the bulk of the inflowing sewage.

The intermediate portion of the partition —14— is provided with relatively small openings —18— in transversely spaced relation, and preferably near the side walls and at about the level of the lower ends of the baffle plates —8— and —9—, and therefore some distance below the inlet —6— and outlet —7—, thereby connecting the compartments —16— and —17— at a level some distance above the bottom —1—, the remaining portions of the partition being imperforate.

This partition —14— also serves to retard the direct and too rigid flow of the sewage through the tank from the inlet to the outlet, while the openings —18— therethrough are arranged a sufficient distance above the bottom —1— to assure proper sedimentation or deposit of the sediment into the compartment —16— and consequent separation of the larger portion of the solids from the liquid body overflowing into the compartment —17— and by reason of the sluggish flow of the sewage through the tank any solids which may overflow from the compartment —16— through the openings —18— and into the compartment —17— will be further separated from the liquid in the compartment —17—, thereby permitting the more or less refined liquid to flow upwardly through the passage —11— and thence outwardly through the outlet —7— into the soil, all of which contributes to the thoroughness of the bacteria action mainly in the sludge chamber —16— and partly in the chamber —17—, and also assures an even flow of the sewage into the tank and a similar even flow of the liquid from the tank through the outlet and at the same time increases the refining action of the liquid in the chamber —17—.

The object in placing the openings —18— in the partition —14— near the opposite sides of the tank is to reduce to a minimum dead or inactive corners and thereby to avoid accumulation of solid matter therein, due to the flow of the material from one compartment to the other throught the openings —18— near the corners, and thereby increasing the hygienic features of the tank as a whole when in use.

*Operation.*

The sewage entering the tank through the inlet passage —6— first impinges against the baffle plate —8— by which it is deflected downwardly toward the bottom of the tank some distance below the level of the outlet —7— or to about the level of the openings —18— and the partition —14—, thereby causing the major portion of the sludge to settle at the bottom while the liquid which may contain more or less of the sludge in suspension must rise to the level of the openings —18— thereby causing a further deposit of the sludge body. The liquid is allowed to flow through the opening —18— into the compartment —17— which later may be termed the liquid compartment by reason of the fact that most of the sludge has been separated therefrom before over-flowing through the openings —18—.

As the liquid rises in the chamber —17— above the bottom of the baffle plate —9—, the latter serves to retard the rapid outflow thereof through the outlet —7— by reason of the fact that the passage —13— is of relatively small area as compared with the area of the compartment —17—, thereby effecting a further refinement of the liquid or separation of the solids therefrom, and allowing the refined liquid to overflow through the outlet —7— into the soil, it being understood that the passages —12—, —13— and —15— at the upper ends of the baffle plates —8— and —9— and partition —14— permits the escape of gases from the interior of the tank through the outlet, and aid materially in the regularity of the flow of the material into and through the tank.

We claim:

A septic tank comprising an upright cylindrical shell having diametrically opposite inlet and outlet openings, the outlet opening being disposed in a plane slightly below the inlet, baffle plates across the inner ends of said openings and having their upper ends open and terminating in a plane below the top of the tank and above the openings and their lower ends open and terminating in a horizontal plane some distance below the openings, and an upright transverse partition disposed in a plane at substantially right angles to a vertical plane passing through the centers of the openings and between the baffle plates in spaced relation thereto, said partition extending from the bottom of the tank to about the level of the upper ends of the baffle plates and provided with an opening therethrough in approximately the plane of the lower ends of the baffle plates.

In witness whereof we have hereunto set our hands this 10th day of March, 1926.

CHARLES L. CARPENTER.
WILLARD E. JAQUITH.